US008694179B2

(12) United States Patent
Guillot et al.

(10) Patent No.: US 8,694,179 B2
(45) Date of Patent: Apr. 8, 2014

(54) DEVICE FOR DISPLAYING CRITICAL AND NON-CRITICAL INFORMATION, AND AIRCRAFT INCLUDING SUCH A DEVICE

(75) Inventors: François Guillot, Paris (FR); Jerôme Pierson, Paris (FR); Pascal Coppee, Paris (FR); Yann Vandenbaviere, Paris (FR)

(73) Assignee: Sagem Defense Securite, Paris (FR)

( * ) Notice: Subject to any disclaimer, the term of this patent is extended or adjusted under 35 U.S.C. 154(b) by 159 days.

(21) Appl. No.: 13/513,496

(22) PCT Filed: Nov. 25, 2010

(86) PCT No.: PCT/EP2010/007143
§ 371 (c)(1),
(2), (4) Date: Jun. 1, 2012

(87) PCT Pub. No.: WO2011/066920
PCT Pub. Date: Jun. 9, 2011

(65) Prior Publication Data
US 2012/0245759 A1    Sep. 27, 2012

(30) Foreign Application Priority Data
Dec. 1, 2009    (FR) ...................................... 09 05782

(51) Int. Cl.
*G05D 1/00*    (2006.01)
*G05D 3/00*    (2006.01)
*G06F 7/00*    (2006.01)
*G06F 17/00*    (2006.01)
(52) U.S. Cl.
USPC .................................................. 701/2; 701/1
(58) Field of Classification Search
USPC ......... 701/1, 120, 301, 521, 28, 532, 16, 540, 701/52, 17; 345/502, 522, 545
See application file for complete search history.

(56) References Cited

U.S. PATENT DOCUMENTS 6,822,624 B2 * 11/2004 Naimer et al. ..................... 345/9
7,747,364 B2 *  6/2010 Roy et al. ......................... 701/28
(Continued)

FOREIGN PATENT DOCUMENTS

EP    1 783 725 A2    5/2007
EP    1 912 202 A2    10/2007
(Continued)

OTHER PUBLICATIONS

David Allen, Boeing aeromagazine, Oct. 10, 2006, retrieved from Internet: URL:http://web.archive.org/web/2006101002846; http://www.boeing.com/commercial/aeromagazine/aero_23/EFB_story.html, 8 pages.

*Primary Examiner* — Thomas Black
*Assistant Examiner* — Robert Payne
(74) *Attorney, Agent, or Firm* — Muncy, Geissler, Olds & Lowe, P.C.

(57) ABSTRACT

An information display device has a first processor unit and a second processor unit that are connected to at least one information source. The first processor unit is also connected to a display and to the second processor unit. The first processor unit and the second processor unit each include a computer and a memory. The computer of the second unit is arranged to construct an image for displaying on the display and to transmit it to the computer of the first processor unit, which is arranged to modify the image by incorporating therein information from the information source, and to transmit the modified image to the display. An aircraft fitted with such a device is also provided.

9 Claims, 1 Drawing Sheet

(56) References Cited

U.S. PATENT DOCUMENTS

| | | | |
|---|---|---|---|
| 7,830,389 B2 * | 11/2010 | Maass et al. | 345/503 |
| 7,861,013 B2 * | 12/2010 | Hunkins et al. | 710/30 |
| 8,478,525 B2 * | 7/2013 | Nielsen et al. | 701/521 |
| 8,514,250 B2 * | 8/2013 | Naimer et al. | 345/632 |
| 2004/0046712 A1 | 3/2004 | Naimer et al. | |
| 2009/0157914 A1 | 6/2009 | Hunkins et al. | |

FOREIGN PATENT DOCUMENTS

| | | |
|---|---|---|
| FR | 2 919 951 A1 | 2/2009 |
| WO | WO 2008/106316 A2 | 9/2008 |

* cited by examiner

DEVICE FOR DISPLAYING CRITICAL AND NON-CRITICAL INFORMATION, AND AIRCRAFT INCLUDING SUCH A DEVICE

BACKGROUND OF THE INVENTION

1. Field of the Invention

The present invention relates to a device for displaying both critical information and non-critical information.

2. Brief Discussion of the Related Art

The critical information is information that it is essential for an aircraft pilot to know and that, if erroneous, could lead directly to the loss of the aircraft. The main items of critical information are speed and altitude. That is why a device for displaying critical data is thus itself an element that is critical, such that use thereof on board an aircraft must be preceded by a qualification or certification procedure including stringent tests seeking to demonstrate the robustness, the accuracy, and the reliability of the display device under all circumstances. The design and the fabrication of such a display device are therefore expensive.

In order to improve crew comfort, it is known to display information in the cockpit that is useful, but without being critical. By way of example, this information may comprise outside and inside temperatures, time data, data relating to the operation of certain elements of the aircraft, navigation data, and other information of this type. The device for displaying this information may itself be a non-critical display device or it may be a critical display device.

Proposals are now being made also to display non-critical information that is relatively complex such as map information or more particularly images known as terrain rendering that provide a three-dimensional representation of the zone of the earth's surface over which the aircraft is flying. Displaying terrain rendering images requires two databases, namely: an altitude database containing the altitudes of various points of a territory, which altitudes are determined as a function of a mesh of the territory, together with a photographic database containing aerial photographs of zones surrounding the various points of the territory and using the same mesh. Terrain rendering images are produced by fitting the photographs to the relief extracted from the altitude database. That operation is particularly greedy in terms of calculation and demands large amounts of computer resources, particularly when it is desired to have the images displayed in real time with a refresh rate lying in the range 25 hertz (Hz) to 100 Hz.

Critical display devices do not have sufficient power to perform such calculations, and the amount of development that would be needed to design a critical display device suitable for displaying such information is so great, in particular in terms of qualification testing, that it is considered that providing a critical display device of that kind is completely unrealistic.

It is therefore necessary to have recourse to a non-critical consumer display device that is sold in sufficient volume to justify development costs. However, even there, it would be too expensive to carry out qualification testing on such display devices.

Simultaneously displaying both critical information and non-critical information thus requires the use of both a critical display device and of a non-critical display device, such that the critical and non-critical information is displayed on two different screens. Since non-critical information is generally presented in a manner that is visually more attractive than critical information, there is a risk of the pilot's attention being monopolized by the non-critical information to such an extent that the pilot does not monitor the critical information with all the necessary attention, particularly since the terrain rendering images may, from the point of view of the information they convey, replace in part a raw display of altitude.

SUMMARY OF THE INVENTION

An object of the invention is to remedy the above-mentioned drawbacks at reasonable cost.

To this end, the invention provides an information display device arranged to display information in an aircraft cockpit, the device comprising a first processor unit arranged to be connected to a unit supplying flight data such as the speed and the altitude of the aircraft, and a second processor unit arranged to be connected to an altitude database containing the coordinates of a mesh of a territory together with the associated altitudes, and to a photographic database containing the coordinates of the same mesh of the same territory together with associated photographs. The first processor unit is also connected to a display and to the second processor unit. Each of the first and second processor units comprises a computer and a memory, the computer of the second unit being arranged to construct a terrain rendering image on the basis of information from the altitude database and from the photographic database, and to transmit the image to the computer of the first processor unit, which is arranged to modify the image by incorporating therein information from the information source and to transmit the modified image to the display.

Thus, the information processed by the first processor unit is displayed in an image generated on the basis of information processed by the second processor unit. The critical information constituted by the altitude and the speed of the aircraft is thus incorporated in the terrain rendering images. A user facing the display thus sees both types of information simultaneously. The computer of the first processor unit performs an operation that requires little in terms of calculation resources, i.e. it only needs to incorporate information in an image that has already been calculated by the computer of the second processor unit, and then to cause the modified image to be displayed. The computer of the first processor unit can thus be a critical computer that keeps complete control over the display of the information that it processes directly and that, as a result, always provides the critical information. The computer of the second processor unit does not need to be critical and may be a standard or consumer computer.

According to a particular characteristic, the first processor unit is also connected to the altitude database to verify consistency between the image supplied by the second processor unit and the information from the altitude database, the computer of the first processor unit preferably being arranged to create a simplified image of the relief on the basis of information from the altitude database and to compare the simplified image with the image transmitted by the second processor unit in order to verify consistency between the two images, and the computer of the first processor unit advantageously being arranged, in the event of inconsistency, to cause the flight data to be displayed on its own or to display the flight data incorporated in the simplified image.

Thus, the first processor unit verifies the truth of the information provided by the second processor unit in order to identify any failure of the second processor unit leading to that information being corrupted. In the event of inconsistency, the first processor unit may be arranged to issue an alert, preventing the image that is provided by the second processor unit from being displayed, and displaying only the information that it has itself received, or else displaying its own information when incorporated in the simplified image that it has itself established.

The invention also provides an aircraft fitted with such a display device.

Other characteristics and advantages of the invention appear on reading the following description of particular, non-limiting embodiments of the invention.

BRIEF DESCRIPTION OF THE DRAWINGS

Reference is made to the accompanying drawing, in which.

DETAILED DESCRIPTION OF THE PREFERRED EMBODIMENTS

Figure 1:
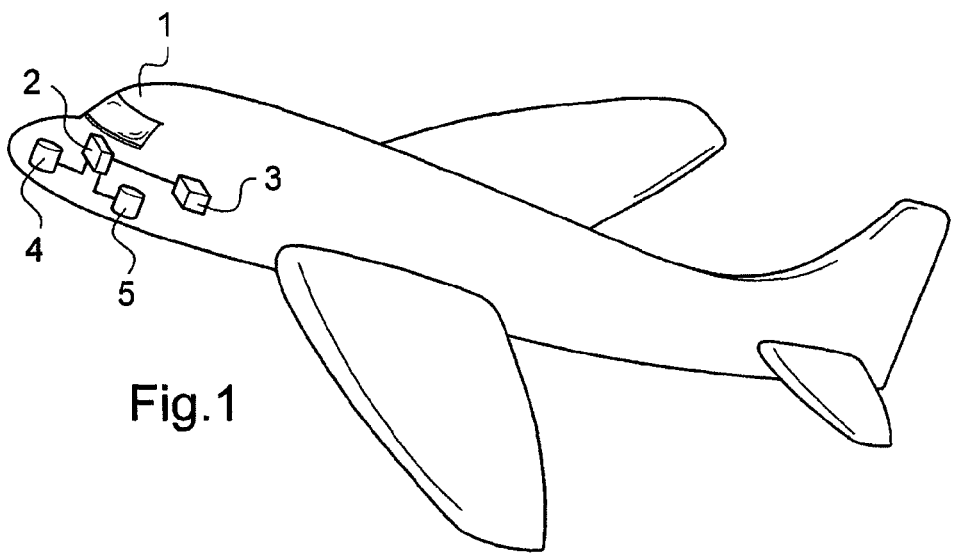
FIG. 1 is a diagrammatic view of an aircraft fitted with a display device in accordance with the invention.
Figure 2:
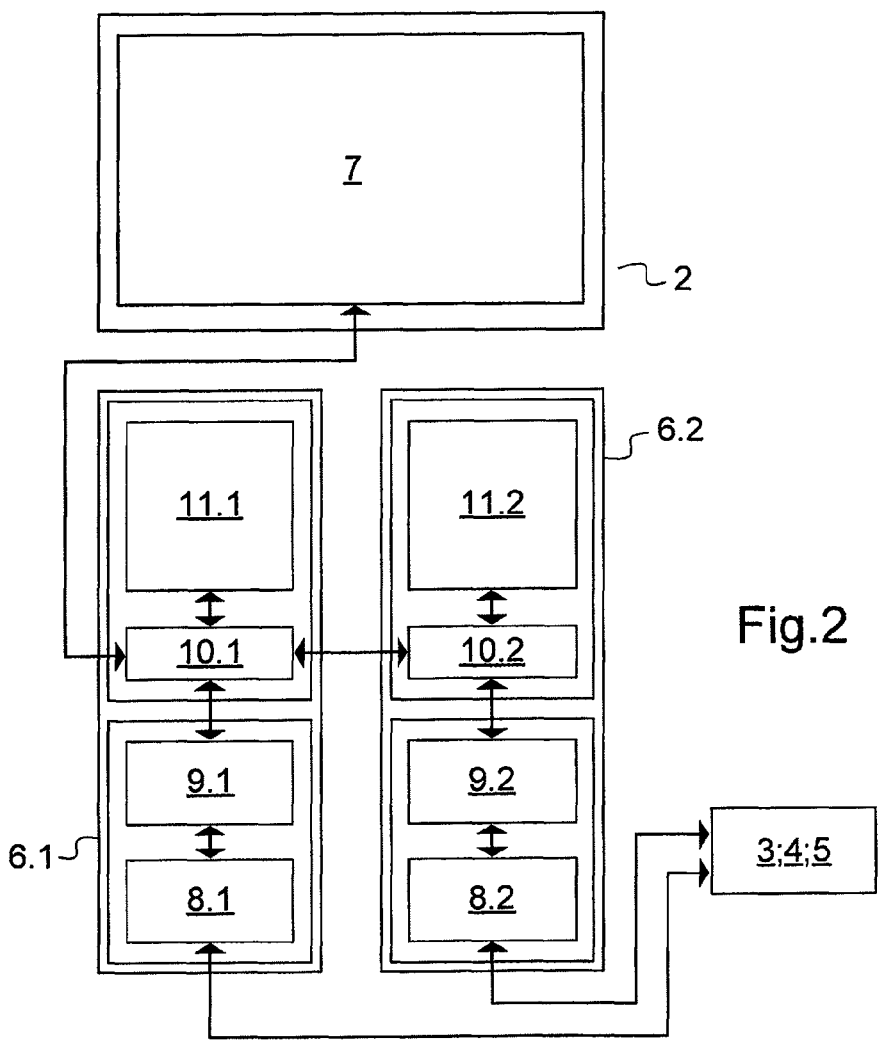
FIG. 2 is a diagrammatic view of the display device.

The invention is described herein in an application to simultaneously displaying the altitude and the speed of the aircraft together with terrain rendering images.

With reference to the figures, the aircraft, here an airplane, has a cockpit 1 in which there are arranged: a display device 2; a navigation unit 3 serving in particular to provide the speed and the altitude of the airplane; an altitude database 4 containing the coordinates of points in a mesh on the territory being overflown by the airplane together with the altitudes associated at each point in the mesh; and a photographic database 5 containing the coordinates of the points in the same mesh of the territory being overflown by the airplane together with aerial photographs associated with those points.

The control device 2 comprises a first processor unit 6.1, a second processor unit 6.2, and a display 7.

The first processor unit 6.1 has a connection interface 8.1 connected firstly to the navigation unit 3 and to the altitude database 4, and secondly to a computer 9.1 associated with a controller 10.1 that performs a data exchange function, and with a memory 11.1.

The second processor unit 6.2 comprises a connection interface 8.2 connected firstly to the photographic database 5 and to the altitude database 4, and secondly to a computer 9.2 associated with a graphics controller 10.2 and with a memory 11.2.

The graphics controller 10.2 is connected to the controller 10.1 by a digital video interface-digital (DVID) type connection.

The computer 9.2 is arranged to create terrain rendering images based on the information from the photographic database 5 and from the altitude database 4. The method of creating terrain rendering images is itself known, and roughly speaking it consists, starting from the location of the airplane, e.g. as provided by the navigation unit, in the following:

- extracting the altitudes and the photographs from the database that correspond to the zone being overflown;
- on the basis of the altitudes, generating a representation of the relief in said zone; and
- fitting the photographs onto said representation.

The terrain rendering images are then transmitted by the graphics controller 10.2 to the controller 10.1 that records them in the memory 11.1. The controller receives a raw description of what it is to display on the display and it records it in a memory plane 11.1 (bit-wise addressing of the content of the terrain rendering image in the memory 11.1).

The computer 9.1 is programmed to modify each terrain rendering image by incorporating therein the speed and the altitude of the airplane as provided by the navigation unit 3.

Some of the zones in the plane containing the image that is to be modified are thus replaced by writing the speed and the altitude. The speed and altitude information may be incorporated as an overlay on the terrain rendering image or in a dedicated window provided in the terrain rendering image.

Once the modification is complete, the computer 9.1 instructs the controller 10.1 to display the modified image.

The memory 11.1 in this example is arranged as a set of planes, i.e. one plane for containing the terrain rendering image that is to be modified, another plane for containing the image that is being modified, and another plane for containing the modified image that is being displayed.

The display, and thus the prior processing performed by the computers 9.1 and 9.2 take place at a rate lying in the range 25 Hz to 100 Hz.

The computer 9.1 is also programmed to verify that the terrain rendering image is consistent with the altitude information that the computer 9.1 extracts directly from the altitude database 4.

To do this, the computer 9.1 creates a simplified image of the relief from the information in the altitude database 3. This simplified image may for example be in the form of an envelope based on a three-dimensional wire mesh in which the nodes correspond to points recorded with their altitudes in the altitude database 3 for the zone being overflown by the airplane. The computer 9.1 compares the simplified image with the image transmitted by the second processor 6.2 to verify that the two images are consistent with each other.

The computer 9.1 of the first processor unit 6.1 is programmed, in the event of inconsistency, to cause either the flight data to be displayed on its own or else to cause the simplified image to be displayed with the flight data incorporated therein.

The display 7 in this example is a high definition display in the 16/9 or 16/10 format.

Naturally, the invention is not limited to the embodiment described but covers any variant coming within the ambit of the invention as defined by the claims.

In particular, other information may be processed by the processor unit. The processor unit may be connected to a single data source or to the same data sources, or indeed they may be connected to different data sources.

In a variant, the computer 9.1 may be synchronized by the DVID connection so as to modify the terrain rendering image on-the-fly as it is being transmitted to the graphics controller 10.1. The memory 10.1 then contains only the modified image that is being displayed.

The display device may be of a structure that is different from that described. The processor units may be incorporated in the display, or on the contrary they may be remote therefrom.

Standards other than the DVID standard may be used for the connection between the processor units, and standards other than the 16/9 or 16/10 high definition standards may naturally also be used.

Consistency may be verified without having recourse to a simplified image of the relief, e.g. by comparing points in the terrain rendering image. Consistency may be verified a priori or a posteriori. Although verifying consistency is advantageous, it is optional.

What is claimed is:

1. An information display device arranged to display information in an aircraft cockpit, the device comprising a first processor unit arranged to be connected to a unit supplying flight data such as the speed and the altitude of the aircraft, and a second processor unit arranged to be connected to an altitude database containing the coordinates of a mesh of a territory together with the associated altitudes, and to a photographic database containing the coordinates of the same mesh of the same territory together with associated photographs, the first processor unit also being connected to a display and to the second processor unit, the first processor unit and the second processor unit each comprising a computer and a memory, the computer of the second unit being arranged to construct a terrain rendering image on the basis of information from the altitude database and from the photographic database, and to transmit the image to the computer of the first processor unit, which is arranged to modify the image by incorporating therein information from the information source and to transmit the modified image to the display.

2. The device according to claim 1, wherein the memory of the first unit is organized to store an image for modification, an image being modified, and a modified image being displayed.

3. The device according to claim 1, wherein the computer of the first unit is synchronized with the computer of the second unit to modify the images while they are being transmitted from the computer of the second processor unit to the computer of the first processor unit.

4. The device according to claim 1, wherein the computer of the first processor unit is arranged to verify consistency between the image transmitted by the second processor unit and information from the information source.

5. The device according to claim 1, wherein the first processor unit is also connected to the altitude database to verify consistency between the image supplied by the second processor unit and the information from the altitude database.

6. The device according to claim 5, wherein the computer of the first processor unit is arranged to create a simplified image of the relief on the basis of information from the altitude database and to compare the simplified image with the image transmitted by the second processor unit in order to verify consistency between the two images.

7. The device according to claim 6, wherein the computer of the first processor unit is arranged, in the event of inconsistency, to cause the flight data to be displayed on its own, or else to display the flight data incorporated in the simplified image.

8. The device according to claim 1, wherein the computer of the first processor unit is arranged to write the information as an overlay on the image and/or to create an information display window in the image.

9. An aircraft fitted with a device according to claim 1.

* * * * *